United States Patent
Zhao

(10) Patent No.: US 9,904,147 B2
(45) Date of Patent: Feb. 27, 2018

(54) GIMBAL

(71) Applicant: SZ DJI TECHNOLOGY CO., LTD., Shenzhen (CN)

(72) Inventor: Yan chong Zhao, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/129,805

(22) PCT Filed: Mar. 27, 2014

(86) PCT No.: PCT/CN2014/074233
§ 371 (c)(1),
(2) Date: Sep. 27, 2016

(87) PCT Pub. No.: WO2015/143685
PCT Pub. Date: Oct. 1, 2015

(65) Prior Publication Data
US 2017/0131622 A1    May 11, 2017

(51) Int. Cl.
*G03B 17/56* (2006.01)
*F16M 11/04* (2006.01)
*F16M 13/02* (2006.01)

(52) U.S. Cl.
CPC ......... *G03B 17/561* (2013.01); *F16M 11/045* (2013.01); *F16M 11/048* (2013.01); *F16M 13/022* (2013.01); *F16M 2200/025* (2013.01)

(58) Field of Classification Search
CPC combination set(s) only.
See application file for complete search history.

(56) References Cited

U.S. PATENT DOCUMENTS 4,979,709 A   12/1990   Ishikawa
5,995,758 A   11/1999   Tyler
(Continued)

FOREIGN PATENT DOCUMENTS

CN    2265470      10/1997
CN    201425692    3/2010
(Continued)

OTHER PUBLICATIONS

International Search Report dated Jul. 8, 2014, in corresponding International Application No. PCT/CN2014/074233 issued by the State Intellectual Property Office of the P.R. China: 10 pages.

*Primary Examiner* — Minh Phan
(74) *Attorney, Agent, or Firm* — Finnegan, Henderson, Farabow, Garrett & Dunner, L.L.P.

(57) ABSTRACT

The present invention discloses a gimbal for carrying an imaging device. The gimbal comprises a first support frame, a locking device arranged on the first support frame, and a second support frame hinged with the first support frame and being capable of driving in rotation of the first support frame. The locking device is configured to carry the imaging device. The first support frame comprises two first struts. The gimbal further comprises at least one center of gravity (CG) adjusting unit, the at least one CG adjusting unit being arranged at least within one of the first struts. The at least one CG adjusting unit is configured to adjust the center of gravity of the first support frame. The gimbal of the present invention can adjust the center of gravity of the first support frame through the CG adjusting unit.

14 Claims, 5 Drawing Sheets

(56) References Cited

U.S. PATENT DOCUMENTS

| | | | |
|---|---|---|---|
| 7,789,356 B1* | 9/2010 | Jones | F16M 11/16 |
| | | | 248/178.1 |
| 2014/0037278 A1* | 2/2014 | Wang | F16M 11/10 |
| | | | 396/55 |
| 2014/0037281 A1 | 2/2014 | Carney | |
| 2016/0201847 A1* | 7/2016 | Firchau | F16M 11/041 |
| | | | 224/567 |

FOREIGN PATENT DOCUMENTS

| | | |
|---|---|---|
| CN | 201707537 | 1/2011 |
| CN | 201903734 | 7/2011 |
| CN | 202295294 | 7/2012 |
| DE | 202005001542 | 3/2005 |
| FR | 2793870 | 11/2000 |
| JP | 2008-131539 | 6/2008 |

\* cited by examiner

GIMBAL

CROSS REFERENCE TO RELATED APPLICATIONS

This application is a national phase application of International Application No. PCT/CN2014/074233, filed Mar. 27, 2014, the content of which is incorporated herein by reference in its entirety.

TECHNICAL FIELD

The present invention relates to a gimbal.

BACKGROUND OF THE INVENTION

A gimbal is a support for mounting a video camera which is to be disposed on the gimbal. A lens of the video camera can be adjusted to properly shoot a target by adjusting the gimbal. The gimbal may be compatible with various types of video cameras or lenses, and the center of gravity of each axis of the gimbal is adjustable. However, in existing mechanisms, the center of gravity is adjusted by a relative displacement of various structural members of the gimbal. Since most of the structural members bear loads, the static friction between the structural members is too high so that a relative movement therebetween is difficult. Moreover, a small amount of relative displacement leads to a significant change in the center of gravity, making it difficult to adjust the center of gravity.

SUMMARY OF THE INVENTION

An object of the present invention is to provide a gimbal which is capable of quickly balancing its center of gravity.

In order to address the technical problem as discussed hereinabove, the present invention provides a gimbal for carrying an imaging device. The gimbal may comprise a first support frame, a locking device arranged on the first support frame, and a second support frame hinged with the first support frame and being capable of driving a rotation of the first support frame. The locking device may carry the imaging device. The first support frame may comprise two first struts. The gimbal may further comprise at least one center of gravity (CG) adjusting unit, the at least one CG adjusting unit may be at least arranged within one of the first struts. The at least one CG adjusting unit may adjust the center of gravity of the first support frame.

In some embodiments, the CG adjusting unit may comprise a threaded rod, a weight through which the threaded rod penetrates and threadably connected with the threaded rod, and a rotating device; the threaded rod and the weight may be arranged within the first strut; the rotating device may be fixedly connected with one end of the threaded rod, so that when the rotating device rotates the threaded rod, the weight may move along a longitudinal direction of the threaded rod in accordance with the rotation of the rotating device.

In some embodiments, the first strut may be a hollow cylinder; the weight may be a corresponding cylinder; a sidewall of the weight may be provided with at least one receiving groove; the CG adjusting unit may further comprise at least one anti-slipping block and each of the at least one anti-slipping block may be received in a corresponding one of the at least one receiving groove.

In some embodiments, the threaded rod may comprise a threaded region and two unthreaded regions arranged respectively at two ends of the threaded region, the threaded region may be provided with external thread, and the unthreaded regions may be provided with no thread; the length of the threaded rod may be greater than the length of the first strut; the CG adjusting unit may further comprise at least one attaching device; each threaded rod may be provided with two attaching devices, the two attaching devices may be respectively arranged at the two unthreaded regions located at two ends of the threaded rod and configured to lock the threaded rod within the first strut.

In some embodiments, each of the attaching devices may comprise a central positioning member and an fastening member for receiving the central positioning member; a central portion of the central positioning member may be provided with a first through hole; the fastening member may comprise an abutting portion and an extension portion extending along the abutting portion; the extension portion may be provided with a positioning groove having a shape and a size matching with the central positioning member; the central positioning member may be received in the positioning groove and fixedly connected with the abutting portion; a second through hole corresponding to the unthreaded region is provided at the central portion of the abutting portion of the fastening member; the second through hole may be in communication with the positioning groove; the unthreaded region at one end of the threaded rod may be sleeved in the second through hole and capable of rotating within the second through hole; the other one of the attaching devices may be assembled to the other end of the first strut; the length of the threaded rod may be greater than the length of the first strut; the unthreaded region at the other end of the threaded rod may protrude out of the other one of the second through hole and may be fixedly connected with the rotating device.

In some embodiments, the central portion of the rotating device may be provided with a fixing hole, and a side of the rotating device may be provided with a side threaded hole in communication with the fixing hole; the portion of the unthreaded region of the threaded rod protruding out of the other one of the second through holes may be received in the fixing hole and threadably connected with the side threaded hole through a bolt; one end of the bolt may abut against the unthreaded region within the fixing hole to fixedly connect the rotating device with the threaded rod.

In some embodiments, the first strut and the weight may be cuboid or cube in shape.

In some embodiments, the first support frame may further comprise two guiding posts and two first fastening devices; the two guiding posts may be arranged substantially perpendicular to the two first struts and may move along the longitudinal direction of the guiding posts; and the two guiding posts can be fixed to the first struts through the first fastening devices.

In some embodiments, at least the first struts or the guiding posts may be marked with scales.

In some embodiments, the locking device may be movably arranged on the guiding posts; the locking device may comprise a quick release plate, a sliding seat and a locking component; the quick release plate may be slidably connected with the sliding seat; the locking component may be connected to the sliding seat and locks the quick release plate with the sliding seat; the quick release plate may fastens the imaging device; the sliding seat may comprise a central portion and two elastic clamping portions respectively arranged on two sides of the central portion; the elastic clamping portions may respectively clamp one of the guiding posts; the elastic clamping portion may be provided with an alignment mark, the alignment mark may match with the scales of the guiding posts and may mark a position of the sliding seat on the guiding post.

In some embodiments, each of the first struts may comprise a connecting end, the connecting end may be provided with a through hole, the through hole may be provided with a rotating shaft therein; one end of the rotating shaft may be received in and protrude out of the through hole; the gimbal may further comprise a second support frame that is hinged with the first support frame and capable of driving the rotation of the first support frame; the second support frame may comprise two second struts, a driving device and an assembly frame; one of the second struts may be directly hinged with a rotating shaft of one of the first struts, and the other one of the second struts may be hinged with a rotating shaft of the other one of the first struts through the driving device.

In some embodiments, the axial direction of the through hole may be substantially perpendicular to the longitudinal direction of the first struts; an axial direction of a driving shaft of the driving device may be substantially perpendicular to a longitudinal direction of the second struts; the driving device may be fixed to one end of the second struts adjacent to the first struts; a driving shaft of the driving device may be fixedly connected with a rotating shaft of one of the first struts to drive a rotation of the rotating shaft, and to drive a rotation of the first support frame.

In some embodiments, the second support frame may further comprise an assembly frame; the assembly frame may be fixedly arranged at the end of the second struts far from the first struts; two receiving holes may be provided in the assembly frame at positions corresponding to the second struts; the two second struts may be respectively received in the two receiving holes; the control device may further comprise a support, the support may be fixedly arranged between the two guiding posts, and the control component may be fixedly arranged on the support.

In some embodiments, the gimbal may further comprise a control device fixedly arranged on the first support frame; the control device comprises a control component comprising an inertial measurement unit (IMU) and a processor; the IMU may measure an attitude information of the imaging device; the processor may be electrically connected to the IMU and the driving device; and the processor may control relevant actions of the driving device according to the attitude information of the imaging device detected by the IMU.

As compared with the prior art, the gimbal of present invention may further comprise at least one center of gravity adjusting unit which may be at least arranged in the first strut. Therefore, the gimbal may be capable of adjusting the center of gravity of the first support frame, the locking device and the imaging device as a whole by the center of gravity adjusting unit.

DETAILED DESCRIPTION OF THE INVENTION

Figure 1:
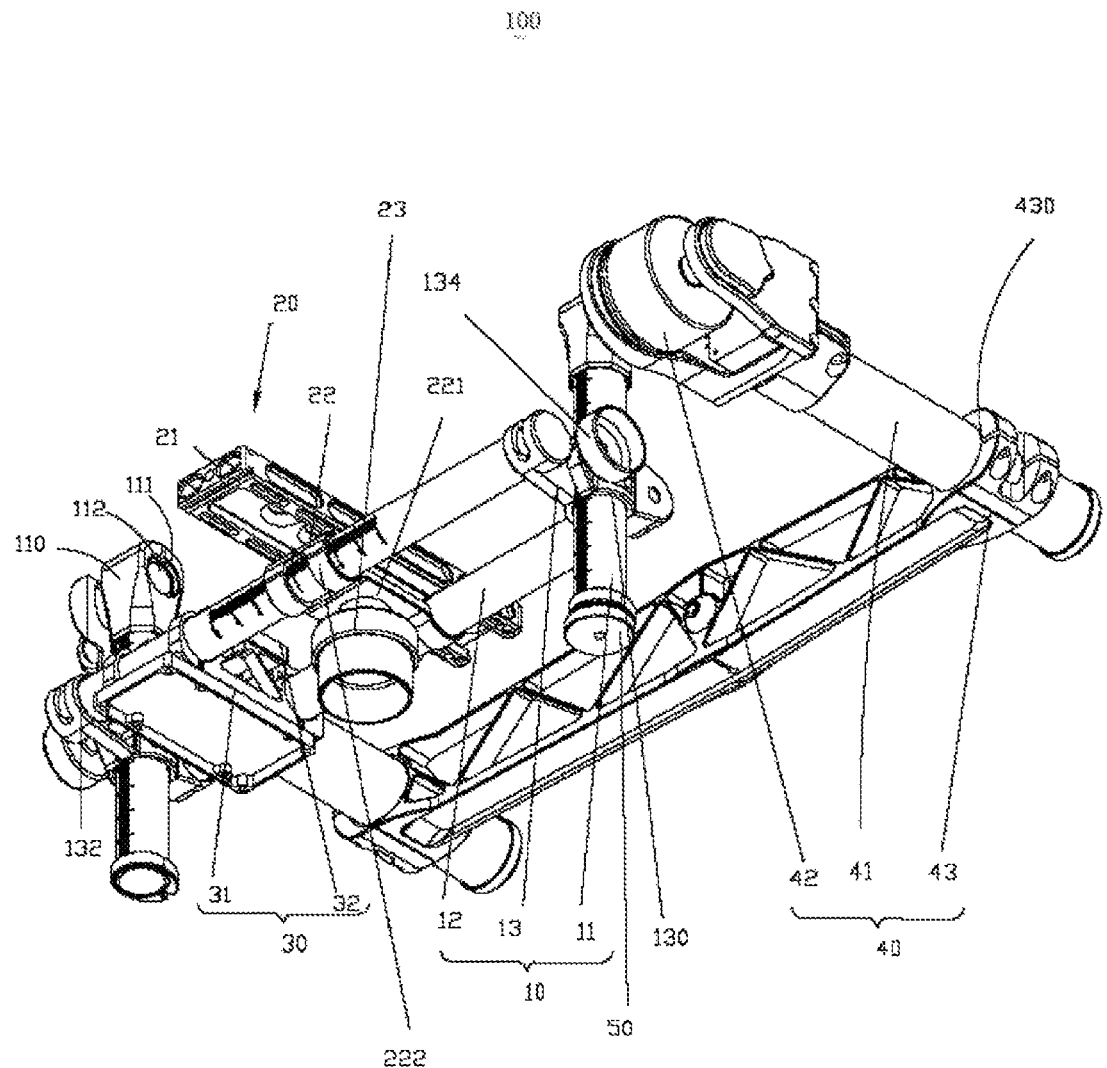
FIG. 1 is a three-dimensional assembly diagram of a gimbal provided by the present invention.
Figure 2:
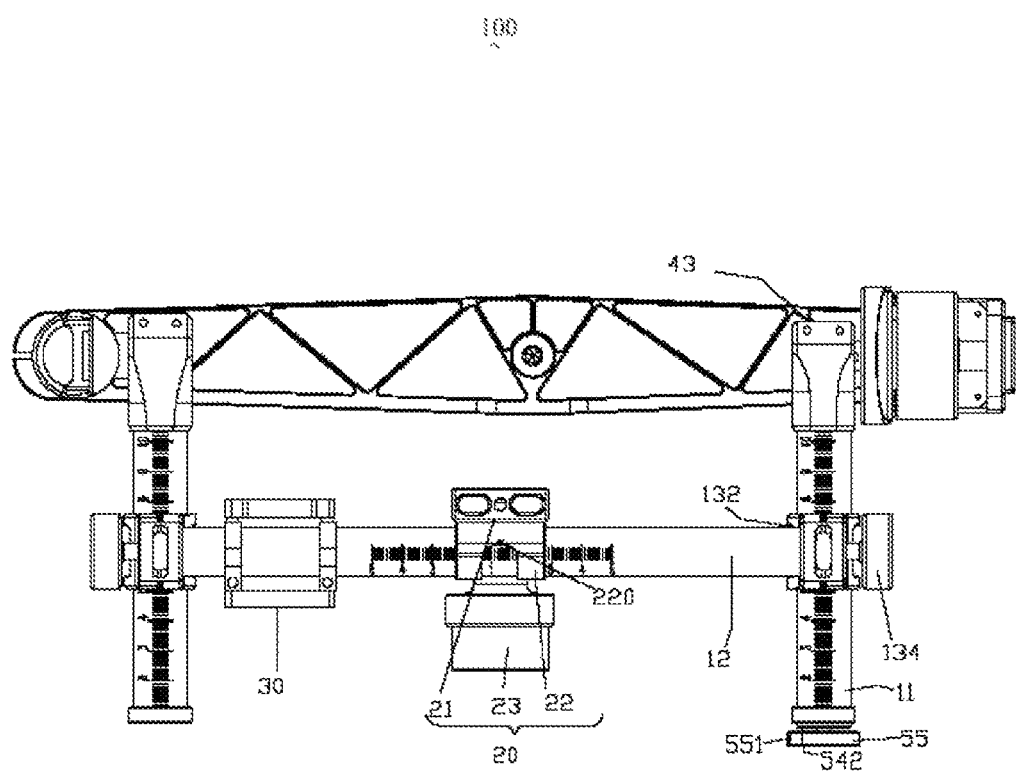
FIG. 2 is a three-dimensional disassembled diagram of the gimbal in FIG. 1.
Figure 3:
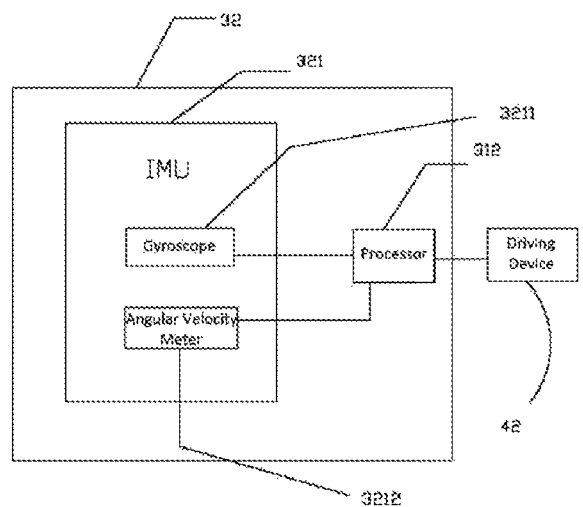
FIG. 3 is a schematic diagram showing a connection between a control device and a driving device in the gimbal of FIG. 1.
Figure 6:
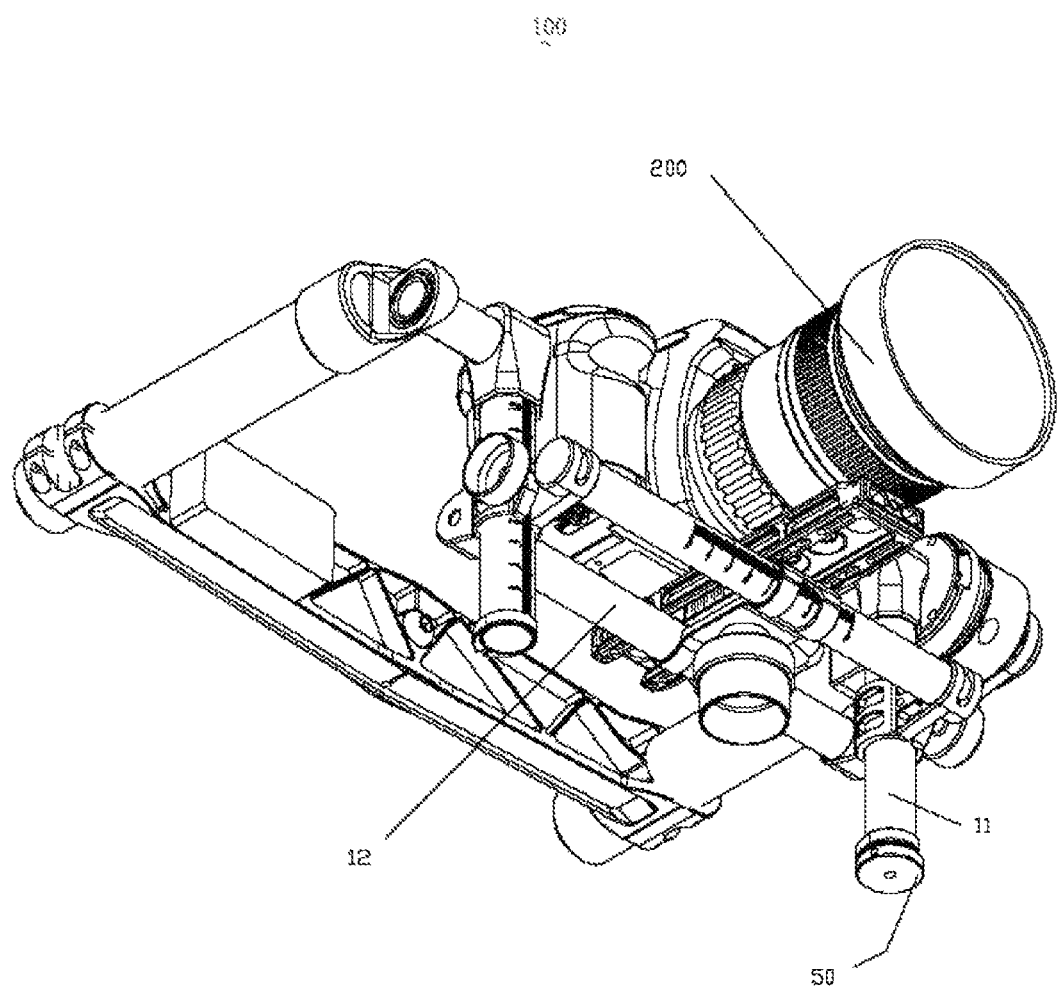
FIG. 6 is a diagram showing the gimbal of FIG. 1 under a working condition.

Referring to FIG. 1 to FIG. 3, the present invention provides a gimbal 100 for carrying an imaging device 200 (as shown in FIG. 6). The imaging device 200 may be a camera, a video camera, a lens, etc. In some embodiments, the imaging device 200 may be a camera. The gimbal 100 may comprise a first support frame 10, a locking device 20 movably arranged on the first support frame 10, a control device 30 fixedly arranged on the first support frame 10, a second support frame 40 hinged with the first support frame 10 and capable of driving a rotation of the first support frame 10, and at least a center of gravity (CG) adjusting unit 50 arranged in the first support frame 10 and configured to adjust the center of gravity of the first support frame 10.

In some embodiments, the first support frame 10 may comprise two first struts 11, two guiding posts 12 and two first fastening devices 13. The two guiding posts 12 may be arranged perpendicular to the two first struts 11. The two guiding posts 12 may be movable along a longitudinal direction of the first struts 11 through the first fastening device 13, and may be fixed at an arbitrary position of the first strut 11 through the first fastening device 13.

In some embodiments, the first strut 11 may be a cylinder having scales marked on its external surface. Each first strut 11 may comprise a connecting end 110 which is provided with a through hole 111. In some embodiments, the axial direction of the through hole 111 may be substantially perpendicular to the longitudinal direction of the first strut 11. A rotating shaft 112 may be provided within the through hole 111, an end of which may be received in the through hole 111 and protrude out of the through hole 111. Alternatively, the first strut 11 may have other shapes.

In some embodiments, the two guiding posts 12 may be cylinders having scales marked on their external surfaces. Alternatively, the guiding post 12 may have other shapes.

Each of the first fastening devices 13 may comprise a fastening hole 130, two receiving portions 132 respectively arranged on two sides of the fastening hole 130, and a fastening member 134.

The axial direction of the fastening hole 130 may be substantially perpendicular to the axial direction of the receiving portion 132. The shape and size of the fastening hole 130 may correspond to the shape and size of the first strut 11, respectively. The two first struts 11 may be respectively sheathed in one of the fastening holes 130.

Each of the receiving portions 132 may receive one end of the guiding post 12, such that the two guiding posts 12 may be arranged substantially parallel to each other.

In some embodiments, the fastening member 134 may be configured to lock the first fastening device 13 at an arbitrary position of the first strut 11. In some instances, the fastening member 134 may be a nut. The fastening hole 130 may be collectively formed by two resilient parts. Each of the two resilient parts may be provided with a threaded hole (not shown), and the positions of the two threaded holes may correspond to each other. The fastening member 134 may be threadably connected with the two threaded holes. When the fastening member 134 is tightened, the fastening hole 130 formed by the two resilient parts may tightly fit the first strut 11, such that the first fastening device 13 is fixed on the first strut 11.

Alternatively, a matching between a buckle and a hook may be utilized to fix the first fastening device 13 on the first strut 11. In some instances, a buckle and a hook may be respectively disposed on the two resilient parts, such that the fastening hole 130 formed by the two resilient parts may tightly fit the first strut 11.

The locking device 20 may comprise a quick release plate 21, a sliding seat 22 and a locking component 23. The quick release plate 21 may be slidably connected with the sliding seat 22. The locking component 23 may be connected to the sliding seat 22 and configured to lock the quick release plate 21 with the sliding seat 23. In some embodiments, the quick release plate 21 may be used to fasten the imaging device 200, such as a camera.

The sliding seat 22 may comprise a central portion 221 and two elastic clamping portions 222 respectively arranged on two sides of the central portion 221. The elastic clamping portions 222 may respectively configured to clamp one of the guiding posts 12. The sliding seat 22 may be provided with a first threaded hole (not labeled in the figures) penetrating the central portion 221. The elastic clamping portion 222 of the sliding seat 22 may be provided with an alignment mark 220 thereon. The alignment mark 220 may match the scales of the guiding posts 12 to mark a position of the sliding seat 22 on the guiding post 12.

The locking component 23 may be threadably connected with the first threaded hole. When the elastic clamping portions 222 loosely fit the guiding posts 12, the sliding seat 22 may slide along the guiding post 12. The locking component 23 may be tightened when the elastic clamping portion 222 is needed to clamp the guiding post 12 tightly, such that the elastic clamping portion 222 may tightly clamp the guiding post 12.

The control device 30 may comprise a support 31 and a control component 32 fixedly arranged on the support 31. The support 31 may be fixedly arranged between the two guiding posts 12. In some embodiments, the support 31 may be fixedly arranged on one end of the two guiding posts 12 adjacent to an end of one of the first struts 11. The control component 32 may comprise an inertial measurement unit (IMU) 321 and a processor 332 electrically connected with the IMU. The IMU 321 may measure an attitude information of the imaging device 200. In some instances, the IMU 321 may comprise a gyroscope 3211 and an angular velocity meter 3212. The gyroscope 3211 and the angular velocity meter 3212 may be electrically connected to the processor 312.

The second support frame 40 may comprise two second struts 41, a driving device 42 and an assembly frame 43. In some embodiments, the second strut 41 may be a hollow cylinder. One of the second struts 41 may directly hinged with the rotating shaft 112 of one of the first struts 11, while the other one of the second struts 41 may be hinged with the rotating shaft 112 of the other one of the first struts 11 through the driving device 42. In some instances, the driving device 42 may be fixed to one end of the second strut 41 adjacent to the first strut 11, and a driving shaft (not shown) of the driving device 42 may be fixedly connected with a rotating shaft 112 of one of the first struts 11 to drive a rotation of the rotating shaft 112, and to drive a rotation of the first support frame 10. In some embodiments, the axial direction of the driving shaft of the driving device 42 may be substantially perpendicular to the longitudinal direction of the second strut 42. The driving device 42 may be electrically connected with the processor 312 of the control device 30. The processor 312 may control the driving device 42 according to an attitude information of the imaging device 200 detected by the IMU 321. For instance, the driving device 42 may directly drive a rotation of the first support frame 10 so as to adjust a shooting angle of the imaging device 200, and a rotation speed of the first support frame 10 may be timely adjusted to adapt to various attitudes, thereby improving a shooting stability of the imaging device 200. In some embodiments, the driving device 42 may be a brushless motor. Alternatively, the driving device 42 may be a brush motor or other motors, and may not be limited to any particular embodiments.

The assembly frame 43 may be fixedly arranged on one end of the second strut 41 far from the first strut 11. Two receiving holes 430 may be provided in the assembly frame 43 at positions corresponding to the second struts 41. The two second struts 41 may be respectively received in the two receiving holes 430.

Figure 4:
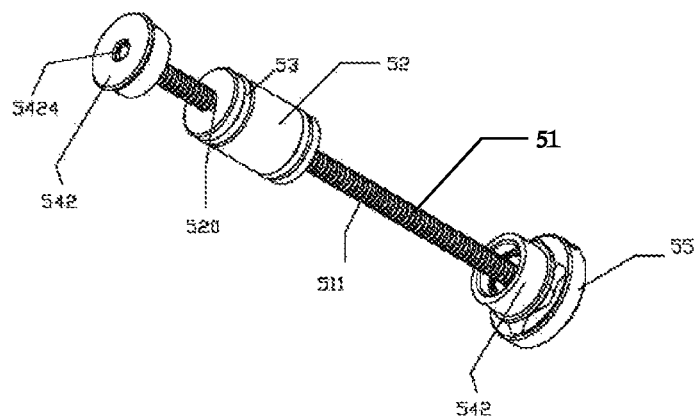
FIG. 4 is a three-dimensional assembly diagram of a center of gravity adjusting unit in the gimbal of FIG. 1.
Figure 5:
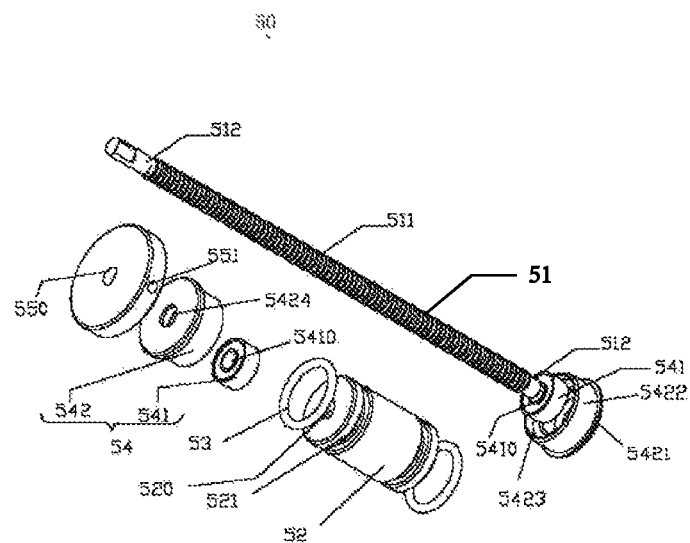
FIG. 5 is a three-dimensional disassembled diagram of the center of gravity adjusting unit of FIG. 4.

Referring to FIGS. 4 and 5, in some embodiments, the CG adjusting unit 50 may be arranged in one of the second struts 41 which is far from the control device 30 to adjust the center of gravity of the first support frame 10, such that the center of gravity of the first support frame 10, the locking device 20, the control device 30 and the imaging device 200 as a whole fall onto the driving shaft of the driving device 42.

For instance, the CG adjusting unit 50 may comprise a threaded rod 51, a weight 52 through which the threaded rod 51 penetrates and threadably connected with the threaded rod 51, two anti-slipping blocks 53, two attaching devices 54 and a rotating device 55.

In some embodiments, the threaded rod 51 may comprise a threaded region 511 and two unthreaded regions 512 disposed respectively on two sides of the threaded region 511. The threaded region 511 may be provided with external thread 510 while the unthreaded regions 512 may be provided with no thread. A length of the threaded rod 51 may be greater than the length of the first strut 11.

The shape of the weight 52 may match the shape of the first strut 11. In some embodiments, the shape of the weight 52 may be cylindrical, and the outer diameter of the weight 52 may be equal to the inner diameter of the first strut 11. The length of the weight 52 may be shorter than the length of the first strut 11. At the central portion, the weight 52 may be provided with a threaded through hole 520 that matches the external thread 510 of the threaded rod 51. The center of the threaded through hole 520 may coincide with the center of the weight 52. Two receiving grooves 521 may be provided on a sidewall of the weight 52. In some embodiments, the weight 52 may be made of metallic materials. Alternatively, the weight 52 may be made of other materials.

In some embodiments, the anti-slipping block 53 may be made of rubber. The anti-slipping block 53 may be a ring shape, and its outer diameter may be slightly greater than or equal to the inner diameter of the first strut 11. The two anti-slipping blocks 53 may be respectively received in the receiving grooves 521 and positioned between the first strut 11 and the weight 52. The anti-slipping block 53 may prevent the weight 52 from rotating together with the threaded rod 51 when the threaded rod 51 rotates.

Alternatively, the amount of the receiving grooves 521 and the amount of the anti-slipping blocks 53 may not be limited to two. The amount of the receiving grooves 521 and the amount of the anti-slipping blocks 53 may be arbitrarily determined as needed, for instance, one or two or more respectively. The amount of anti-slipping blocks 53 provided in the same first strut 11 may not be limited to one, and may be set to two or more as needed, which is not limited to any particular embodiments.

The two attaching devices 54 may be respectively arranged on the two unthreaded regions 512 located at both ends of the threaded rod 51. The two attaching devices 54 may lock the threaded rod 51 within the first strut 11. For instance, each of the attaching devices 51 may comprise a central positioning member 541 and a fastening member 542 for receiving the central positioning member 541. The central positioning member 541 may be circular in shape and may have a first through hole 5410 provided in the central portion thereof. The diameter of the first through hole 5410 may be slightly greater than or equal to the diameter of the unthreaded region 512 of the threaded rod 51, while smaller than the diameter of the threaded region 511. The fastening member 542 may comprise an abutting portion 5421 and an extension portion 5422 extending along the abutting portion 5421. The extension portion 5422 may be provided with a positioning groove 5423 having a shape and a size matching with those of the central positioning member 541. The central positioning member 541 may be received in the positioning groove 5423 and fixedly connected with the abutting portion 5421 by an adhesive. A second through hole 5424 corresponding to the unthreaded region 512 may be provided at the central portion of the abutting portion 5421 of the fastening member 542. The second through hole 5424 may be communicating with the positioning groove 5423. The diameter of the extension portion 5422 may be slightly smaller than or equal to the inner diameter of the first strut 11, and the diameter of the abutting portion 5421 may be greater than the inner diameter of the first strut 11 while equal to or slightly greater than the outer diameter thereof.

A fixing hole 550 may be provided at the central portion of the rotating device 55. A side threaded hole 551 communicating with the fixing hole 550 may be provided at a side of the rotating device 55.

When assembling, firstly, one of the attaching devices 54 may be assembled to one end of the first strut 11, the abutting portion 5421 abutting one end of the first strut 11. Then, the two anti-slipping blocks 53 may be respectively received in the two receiving grooves 521. Subsequently, the threaded through hole 520 of the weight 52 may be threadably connected with the threaded region 511 of the threaded rod 51; and then, the threaded rod 51 and the weight 52 threadably connected together may be assembled into the first strut 11, the unthreaded region 512 at one end of the threaded rod 51 being sleeved in the second through hole 5424 and capable of rotating within the second through hole 5424. Finally, the other one of the attaching devices 54 may be assembled to the other end of the first strut 11. Since the length of the threaded rod 51 is greater than the length of the first strut 11, the unthreaded region 512 at the other end of the threaded rod 51 may protrude out of the other one of the second through holes 5424. The portion of the unthreaded region 512 of the threaded rod 51 protruding out of the second through holes 5424 may be received in the fixing hole 550 of the rotating device 55 and threadably connected with the side threaded hole 551 through a bolt. One end of the bolt may abut against the unthreaded region 512 within the fixing hole 550, thereby fixedly connecting the rotating device 55 with the threaded rod 51. Alternatively, other connecting means of practical applications may be used to fixedly connect the rotating device 55 with the threaded rod 51, for instance, welding.

Referring to FIG. 6, under a working condition, an imaging device 200 of a type may be fixedly arranged on the quick release plate 21. In order to improve the stability of the imaging device 200 during shooting, the center of gravity of the first support frame 10, the locking device 20, the control device 30 and the imaging device 200 as a whole may locate on the rotating shaft of the driving device 42. Based on mechanical analysis, if the center of gravity of the first support frame 10, the locking device 20, the control device 30 and the imaging device 200 as a whole locates on the driving shaft of the driving device 42, the first support frame 10 may generate no rotational torque regardless of a rotation angle, i.e., the first support frame 10 may not shake back and forth due to a torque. Therefore, the stability of the imaging device 200 may be improved during rotation. When the gimbal 100 operates steadily, the first support frame 10 and the imaging device 200 may also operate in a dynamically balanced state. On the other hand, in case the center of gravity among the first support frame 10, the locking device 20, the control device 30 and the imaging device 200 as a whole deviates from the rotating shaft of the driving device 42, the center of gravity can be adjusted to locate on the rotating shaft of the driving device 42 by rotating the rotating device 55. In some embodiments, when the rotating device 55 is rotated, the weight 52 may not rotate in accordance with the rotation of the rotating device 55 but instead move along a longitudinal direction of the threaded rod 51 due to a friction between the anti-slipping block 53 and an inner wall of the first strut 11, because the weight 52 is tightly fitted with the first strut 11 through the anti-slipping block 53. In this way, a fine adjustment to the center of gravity of the first support frame 10, the locking device 20 and the imaging device 200 as a whole may be performed to guarantee that the center of gravity locates on the rotating shaft of the driving device 42.

Alternatively, the first strut 11 and the weight 52 may be shaped into a rectangular, a cubic or other irregular shapes. In these cases, the weight 52 may convert a rotation of the threaded rod 51 into a translation of the weight 52 along the first strut 11, being not limited to any particular embodiments.

Alternatively, at least one weight 52 may be respectively mounted in each of the two first struts 11, being not limited to those particular embodiments.

Alternatively, the control device 30 may be omitted. If the control device 30 is omitted, the CG adjusting unit 50 may adjust the center of gravity of the first support frame 10, such that the center of gravity of the first support frame 10, the locking device 20 and the imaging device 200 as a whole locates on the driving shaft of the driving device 42.

The foregoing disclosure is merely illustrative of the embodiments of the invention but not intended to limit the scope of the invention. Any equivalent structural or equivalent flow changes, which are made without departing from the specification and the drawings of the invention, and a direct or indirect application in other relevant technical field, shall fall into the scope of the invention.

What is claimed is:
1. A gimbal for carrying an imaging device, comprising a first support frame, a second support frame hinged with the first support frame and being capable of driving a rotation of the first support frame, and a locking device arranged on the first support frame;
wherein the first support frame is configured to support the imaging device through the locking device, and the first support frame comprises two first struts;
wherein the gimbal further comprises at least one center of gravity (CG) adjusting unit, and wherein the at least one CG adjusting unit is arranged at least within one of the first struts to adjust the center of gravity of the first support frame;

wherein the CG adjusting unit comprises a rod and a weight through which the rod penetrates, and wherein the rod and the weight are arranged within the one of the first struts, and wherein the weight is configured to move along a longitudinal direction of the rod.

2. The gimbal of claim 1, wherein the rod is threaded and the weight is threadably connected with the threaded rod; and wherein the CG adjusting unit additionally comprises a rotating device which is fixedly connected with one end of the threaded rod, so that when the rotating device rotates the threaded rod, the weight moves along the longitudinal direction of the threaded rod in accordance with the rotation of the rotating device.

3. The gimbal of claim 2, wherein the first strut is a hollow cylinder, the weight is a corresponding cylinder, a sidewall of the weight is provided with at least one receiving groove; and wherein the CG adjusting unit further comprises at least one anti-slipping block and each of the at least one anti-slipping block is received in a corresponding one of the at least one receiving groove.

4. The gimbal of claim 3, wherein the threaded rod comprises a threaded region and two unthreaded regions arranged respectively at two ends of the threaded region, the threaded region is provided with external thread, and the unthreaded regions are provided with no thread; wherein the length of the threaded rod is greater than the length of the first strut; and wherein the CG adjusting unit further comprises at least one attaching device; the threaded rod is provided with two attaching devices, the two attaching devices are respectively arranged at the two unthreaded regions located at two ends of the threaded rod and configured to lock the threaded rod within the first strut.

5. The gimbal of claim 4, wherein each of the attaching devices comprises a central positioning member and an fastening member for receiving the central positioning member; wherein the central portion of the central positioning member is provided with a first through hole; wherein the fastening member comprises an abutting portion and an extension portion extending along the abutting portion; wherein the extension portion is provided with a positioning groove having a shape and a size matching with the central positioning member; wherein the central positioning member is received in the positioning groove and fixedly connected with the abutting portion; wherein a second through hole corresponding to the unthreaded region is provided at the central portion of the abutting portion of the fastening member; wherein the second through hole is in communication with the positioning groove; wherein the unthreaded region at one end of the threaded rod is sleeved in the second through hole and is capable of rotating within the second through hole; wherein the other one of the attaching devices is assembled to the other end of the first strut; wherein the length of the threaded rod is greater than the length of the first strut; and wherein the unthreaded region at the other end of the threaded rod protrudes out of the other one of the second through hole of the other one of the attaching devices and is fixedly connected with the rotating device.

6. The gimbal of claim 5, wherein the central portion of the rotating device is provided with a fixing hole, and a side of the rotating device is provided with a side threaded hole in communication with the fixing hole; the portion of the unthreaded region of the threaded rod protruding out of the other one of the second through holes is received in the fixing hole and threadably connected with the side threaded hole through a bolt; and wherein one end of the bolt abuts against the unthreaded region within the fixing hole to fixedly connect the rotating device with the threaded rod.

7. The gimbal of claim 2, wherein the first strut and the weight are cuboid or cube in shape.

8. The gimbal of claim 1, wherein the first support frame further comprises two guiding posts and two first fastening devices; wherein the two guiding posts are arranged roughly perpendicular to the two first struts and moveable along the longitudinal direction of the first struts; and wherein the two guiding posts can be fixed to the first struts through the first fastening devices.

9. The gimbal of claim 8, wherein the locking device is movably arranged on the guiding posts; wherein the locking device comprises a quick release plate, a sliding seat and a locking component; wherein the quick release plate is slidably connected with the sliding seat; wherein the locking component is connected to the sliding seat and locks the quick release plate with the sliding seat; wherein the quick release plate fastens the imaging device; the sliding seat comprises a central portion and two elastic clamping portions respectively arranged on two sides of the central portion; and wherein the elastic clamping portions respectively clamp one of the guiding posts.

10. The gimbal of claim 8, wherein the guiding posts are marked with scales; and wherein the elastic clamping portion is provided with an alignment mark, the alignment mark matches the scales of the guiding posts and configured to mark the position of the sliding seat on the guiding post.

11. The gimbal of claim 1, wherein each of the first struts comprises a connecting end, the connecting end is provided with a through hole; wherein the through hole is provided with a rotating shaft therein, one end of the rotating shaft is received in and protrudes out of the through hole; and wherein the second support frame comprises two second struts, a driving device and an assembly frame; one of the second struts is directly hinged with a rotating shaft of one of the first struts, and the other one of the second struts is hinged with a rotating shaft of the other one of the first struts through the driving device.

12. The gimbal of claim 11, wherein the axial direction of the through hole is roughly perpendicular to the longitudinal direction of the first struts; wherein the axial direction of a driving shaft of the driving device is roughly perpendicular to the longitudinal direction of the second struts; wherein the driving device is fixed to the end of the second struts adjacent to the first struts; and wherein a driving shaft of the driving device is fixedly connected with a rotating shaft of one of the first struts to drive a rotation of the rotating shaft, and to drive a rotation of the first support frame.

13. The gimbal of claim 12, wherein the second support frame further comprises an assembly frame; wherein the assembly frame is fixedly arranged at the end of the second struts far from the first struts; wherein two receiving holes are provided in the assembly frame at positions corresponding to the second struts; wherein the two second struts are respectively received in the two receiving holes; and wherein the gimbal further comprises a support, the support is fixedly arranged between the two guiding posts, and a control component is fixedly arranged on the support.

14. The gimbal of claim 1, wherein the gimbal further comprises a control device fixedly arranged on the first support frame; wherein the control device comprises a control component comprising an inertial measurement unit (IMU) and a processor; wherein the IMU measures an attitude information of the imaging device; and wherein the processor is electrically connected to the IMU and the driving device, and controls the driving device according to the attitude information of the imaging device detected by the IMU.

* * * * *